United States Patent
Kariya et al.

(10) Patent No.: US 8,826,694 B2
(45) Date of Patent: *Sep. 9, 2014

(54) METHOD OF MANUFACTURING GLASS SHEET

(75) Inventors: Hiroyuki Kariya, Yokkaichi (JP); Nobuhiro Maeda, Yokkaichi (JP)

(73) Assignee: AvanStrate Inc., Mie (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/620,293

(22) Filed: Sep. 14, 2012

(65) Prior Publication Data

US 2013/0067958 A1    Mar. 21, 2013

Related U.S. Application Data

(63) Continuation of application No. PCT/JP2011/072481, filed on Sep. 29, 2011.

(30) Foreign Application Priority Data

Sep. 30, 2010  (JP) ................................. 2010-223087

(51) Int. Cl.
*C03B 17/06*   (2006.01)

(52) U.S. Cl.
CPC ............. *C03B 17/064* (2013.01); *C03B 17/067* (2013.01)
USPC .......................... 65/53; 65/90; 65/95; 65/195

(58) Field of Classification Search
CPC .................................................... C03B 17/064
See application file for complete search history.

(56) References Cited

U.S. PATENT DOCUMENTS

| | | | | |
|---|---|---|---|---|
| 2,691,247 A * | 10/1954 | Henry et al. | ...................... | 65/85 |
| 2010/0162763 A1* | 7/2010 | Pitbladdo | ........................... | 65/90 |
| 2012/0159990 A1* | 6/2012 | Tsuda et al. | ...................... | 65/53 |

FOREIGN PATENT DOCUMENTS

| | | | |
|---|---|---|---|
| JP | 5-124826 A | | 5/1993 |
| JP | 10-53426 A | | 2/1998 |
| JP | 2008-88005 A | | 4/2008 |
| WO | WO 2011007617 A1 | * | 1/2011 |

OTHER PUBLICATIONS

Reliance Electric & Engineering Co., "The Iron Age", p. 1328, Dec. 1919.*
JP2008-088005 Translation—Schreiber Translations, Jul. 2012.*

* cited by examiner

*Primary Examiner* — Matthew Daniels
*Assistant Examiner* — Lisa Herring
(74) *Attorney, Agent, or Firm* — Sughrue Mion, PLLC

(57) ABSTRACT

A method of manufacturing a glass sheet includes creating split flows of molten glass in a forming body (10) and causing the molten glass to flow down, subsequently merging the flows at a merging point to form a glass sheet G and causing the glass sheet to flow downward in the vertical direction. A plurality of chambers (42b, 42c, . . . ) separated by heat-insulating plates (40a, 40b, . . . ) in the direction of movement of the glass sheet G are provided. A heater (60a, 60b, . . . ) is provided for each of the chambers (42b, 42c, . . . ) so that the temperature decreases in the direction of movement. The heat-insulating plates (40a, 40b, . . . ) are disposed facing the glass sheet G, and facing surfaces of the heat-insulating plates (40a, 40b, . . . ) are shaped so as to correspond to a sheet thickness variation of the glass sheet G.

12 Claims, 8 Drawing Sheets

METHOD OF MANUFACTURING GLASS SHEET

This is a Continuation of Application No. PCT/JP2011/072481 filed Sep. 29, 2011, which claims benefit to Japanese Patent Application No. 2010-223087 filed Sep. 30, 2010. All of the above-noted applications are incorporated herein by reference in their entirety.

TECHNICAL FIELD

The present invention relates to a method of manufacturing a glass sheet.

BACKGROUND ART

A downdraw method has conventionally been used as one method of manufacturing a glass sheet. In the downdraw method, split flows of molten glass which overflows from a forming body is created so that the molten glass flows down along the surface of the forming body. The two streams of molten glass are then merged at the lower end of the forming body to form a glass sheet. The glass sheet thus formed is annealed while being conveyed downward. In the annealing process, the glass sheet transitions from a viscous stage to an elastic stage via a viscoelastic stage.

SUMMARY OF INVENTION

Technical Problem

In an apparatus for manufacturing a glass sheet by the downdraw method, an annealing zone, which is a space in which the glass sheet separated from the forming body is cooled without touching anything, is usually partitioned into a plurality of annealing spaces by heat-insulating plates. The heat-insulating plates suppress the movement of heat between the annealing spaces, and are provided to control the atmospheric temperature of each annealing space so that a desired temperature profile is obtained. Here, the desired temperature profile is a temperature distribution in the annealing spaces of the annealing zone so that no distortion occurs in the glass sheet. Specifically, by the heat-insulating plates, the glass sheet is adjusted to the desired temperature in each annealing space while being conveyed downward. The heat-insulating plates are thus highly important for annealing the glass sheet so that the glass sheet is formed with minimal distortion.

However, the thickness of the glass sheet annealed in the annealing zone is usually greater at both width-direction end portions than at the width-direction center portion. Therefore, in a case in which a glass sheet is held between a pair of heat-insulating plates formed by a single sheet, as disclosed in Patent Document 1 (Japanese Unexamined Patent Application Publication No. 2008-88005), the size of the gap between the pair of heat-insulating plates must be set at least so that the end portions in the width direction of the glass sheet, which are the thickest parts thereof, do not touch the heat-insulating plates. However, heat exchange through the gaps between the annealing spaces increases the larger the gaps are, and the problem emerges that it becomes difficult to control the atmospheric temperatures of the annealing zones so that the desired temperature profile is obtained.

Techniques have been used in the past for managing heat by partitioning the annealing zone into a plurality of annealing spaces using heat-insulating plates.

For glass substrates used in liquid crystal display devices, required specs (quality) relating to glass sheet thickness deviation, warping, distortion, and the like have become stricter in recent years.

In the case of manufacturing glass sheets by the downdraw method as described above, in order to reduce thickness deviation, warping, and distortion of the glass, a desired temperature profile is designed in advance for the annealing spaces, and heat is managed for the atmosphere so that the designed temperature profile is achieved.

The precision of the designed temperature profile must be increased in order to satisfy the recent stricter spec requirements, and there is therefore a need to increase the precision of heat management.

An object of the present invention is to provide an improved apparatus for manufacturing a glass sheet, in which the precision of heat management can be increased in the manufacture of a glass sheet by a downdraw method, and to provide a method of manufacturing a glass sheet in which the precision of heat management is increased.

An object of the present invention is more specifically to provide a glass sheet manufacturing method in which the precision of heat management is increased to suppress distortion in the glass sheet; to provide a glass sheet manufactured using the glass sheet manufacturing method; and to provide a glass sheet manufacturing apparatus capable of suppressing distortion in the glass sheet.

Solution to Problem

A method of manufacturing a glass sheet according to the present invention is a method of manufacturing a glass sheet, the method comprising the steps of creating split flows of molten glass in a forming body and causing the molten glass to flow down, subsequently merging the flows at a merging point to form a glass sheet, and causing the glass sheet to flow downward in the vertical direction. In this method of manufacturing a glass sheet, there are provided a plurality of chambers separated by heat-insulating plates in the direction of movement of the glass sheet. Also in this method of manufacturing a glass sheet, a heater for controlling the temperature of the chamber is provided for each of the chambers so that the temperature of the chamber decreases in order in the direction of movement of the glass sheet. The heat-insulating plate is disposed facing the glass sheet, and a facing surface of the heat-insulating plate is shaped so as to correspond to a sheet thickness variation of the glass sheet, so that a gap between the glass sheet and the heat-insulating plate is substantially uniform.

In the process of manufacturing a glass sheet by a downdraw method, the atmospheric temperature of the annealing zone, which is the space in which the formed glass sheet is annealed, preferably fits a desired temperature profile from top to bottom. The annealing zone is therefore usually partitioned by a plate-shaped heat-insulating member into a plurality of annealing spaces which are stacked in the vertical direction. The atmospheric temperatures of the annealing spaces are thereby controlled so as to fit the desired temperature profile.

In the method of manufacturing a glass sheet according to the present invention, pairs of heat-insulating members are provided on both sides in the thickness direction of the glass sheet at a plurality of height positions in the annealing zone, and each heat-insulating member is composed of a first heat-insulating plate and a second heat-insulating plate. One or both of the first heat-insulating plate and the second heat insulating plate can be moved in the thickness direction (horizontal direction) of the glass sheet so that the gap between each heat-insulating member and the glass sheet can be made as small as possible. For example, the gap between the of first heat-insulating plates facing the width-direction center portion of the glass sheet, at which the thickness of the glass sheet is small, is made smaller than the gap between the pair of second heat-insulating plates facing the width-direction end portions of the glass sheet, at which the thickness of the glass sheet is large. Since the open area of the gap between each pair of heat-insulating members is thereby reduced, the movement of heat between adjacent annealing spaces can be suppressed as much as possible. Consequently, in the method of manufacturing a glass sheet according to the present invention, the atmospheric temperatures of the annealing spaces can be controlled to fit the desired temperature profile, and the glass sheet can therefore be annealed so as to be formed with minimal distortion.

In the method of manufacturing a glass sheet according to the present invention, the facing surface of the heat-insulating plate is preferably shaped so as to correspond to the sheet thickness variation of the glass sheet, so that the gap between the glass sheet and the heat-insulating plate decreases. Since the open area of the gap between the glass sheet and the heat-insulating member is further reduced by this heat-insulating member, movement of heat from the forming body accommodating part to the forming zone can be more effectively suppressed.

In the method of manufacturing a glass sheet according to the present invention, the sheet thickness of the glass sheet is preferably greater at both end portions thereof than at a center portion thereof.

In the method of manufacturing a glass sheet according to the present invention, the heat-insulating plate preferably has members which are independent of each other and correspond to a center portion and both end portions of the glass sheet.

In the method of manufacturing a glass sheet according to the present invention, the members preferably separate from and come close to the glass sheet.

Advantageous Effects of Invention

The present invention can provide an improved apparatus for manufacturing a glass sheet, in which the precision of heat management can be increased in the manufacture of a glass sheet by a downdraw method, and can provide a method of manufacturing a glass sheet in which the precision of heat management is increased.

More specifically, the present invention can provide a glass sheet manufacturing method in which distortion of a glass sheet can be suppressed; a glass sheet manufactured using the glass sheet manufacturing method; and an apparatus for manufacturing a glass sheet, capable of suppressing distortion of a glass sheet.

DESCRIPTION OF EMBODIMENTS (1) Overall Configuration

Figure 1:
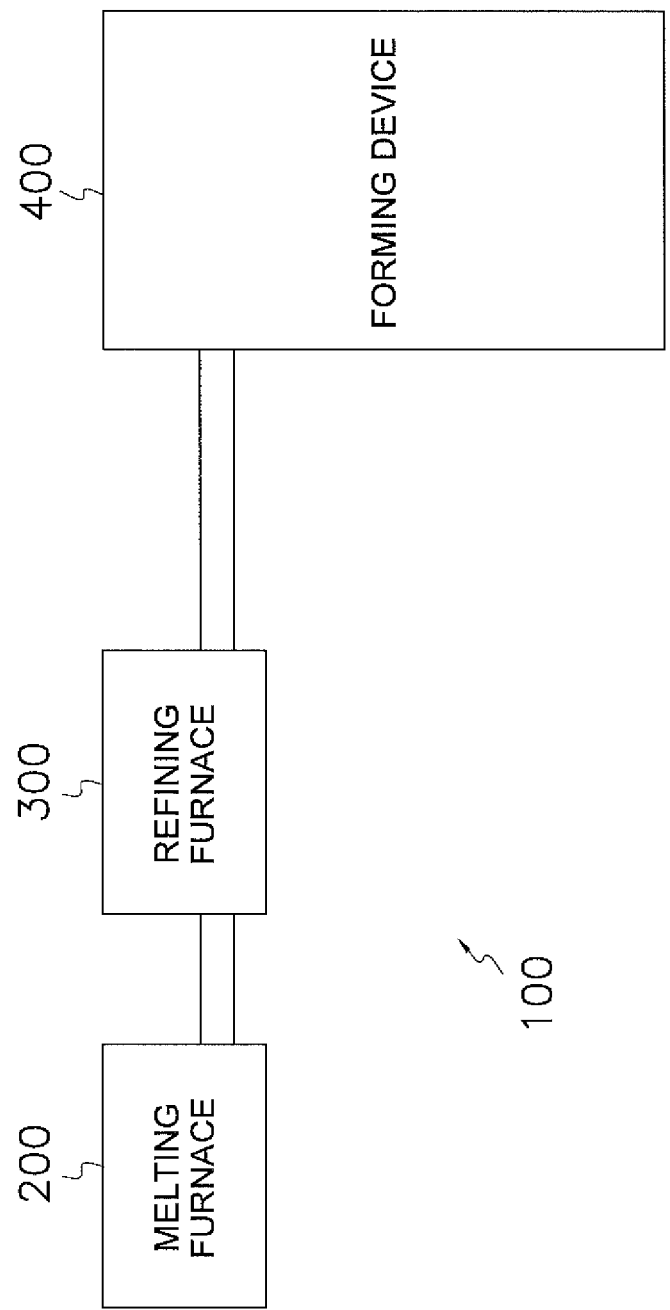
FIG. 1 is a view summarizing the configuration of the glass sheet manufacturing apparatus.

The general configuration of the glass sheet manufacturing apparatus 100 according to an embodiment of the present invention will first be described. As shown in FIG. 1, the glass sheet manufacturing apparatus 100 is composed of a melting furnace 200, a refining furnace 300, and a forming device 400. In the melting furnace 200, raw materials for glass are melted to create molten glass. The molten glass created in the melting furnace 200 is sent to the refining furnace 300. Air bubbles in the molten glass are removed in the refining furnace 300. The molten glass from which air bubbles have been removed by the refining furnace 300 is sent to the forming device 400. In the forming device 400, a glass sheet G is continuously formed from the molten glass by an overflow downdraw method. The glass sheet G thus formed is then annealed and cut into glass sheets of a predetermined size. The glass sheets are used as glass substrates for liquid crystal displays and/or plasma displays and other flat-panel displays.

The detailed configuration of the forming device 400 will next be described.

(2) Detailed Configuration of the Forming Device

Figure 2:
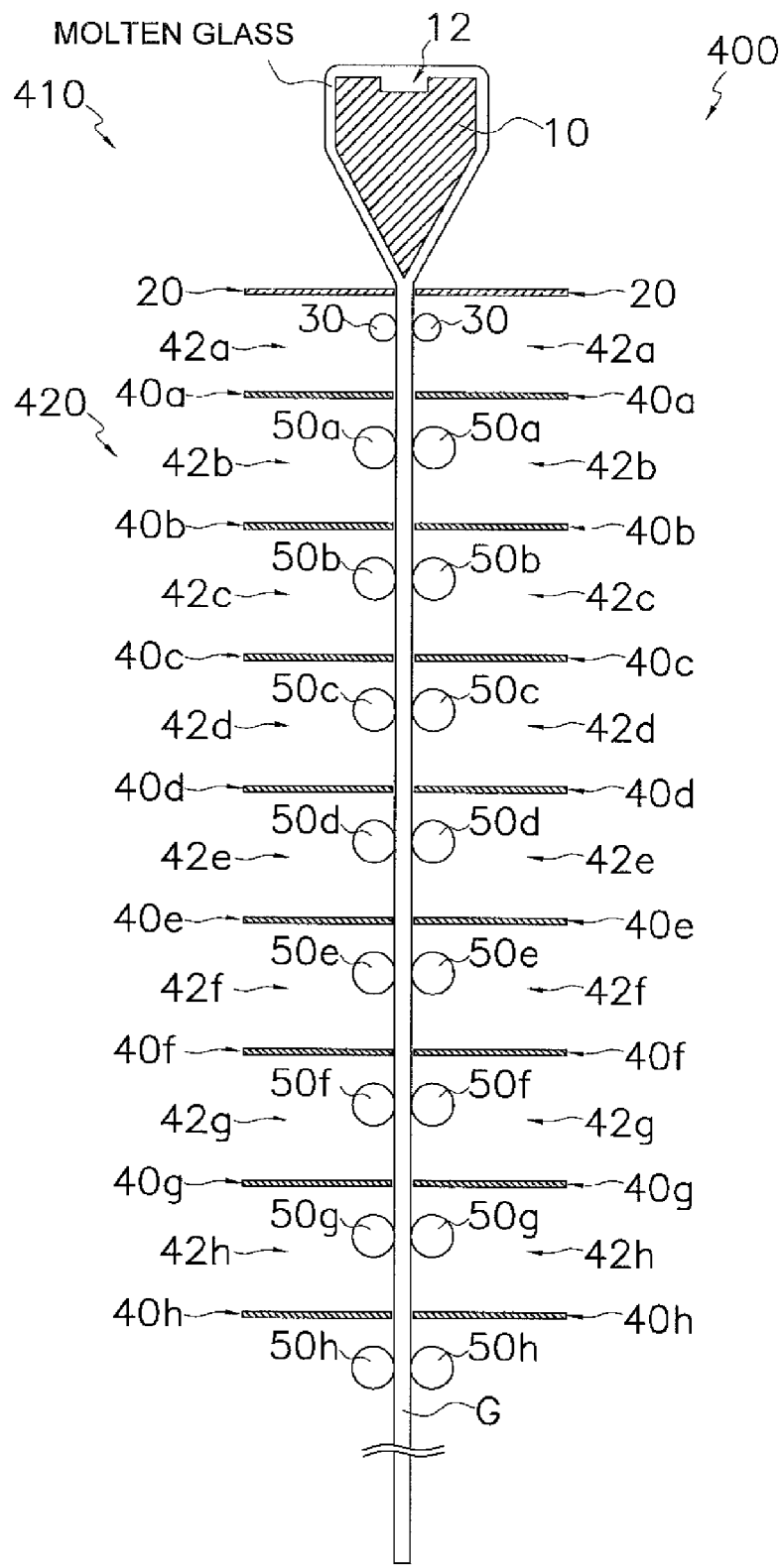
FIG. 2 is a schematic sectional view showing the forming device.
Figure 3:
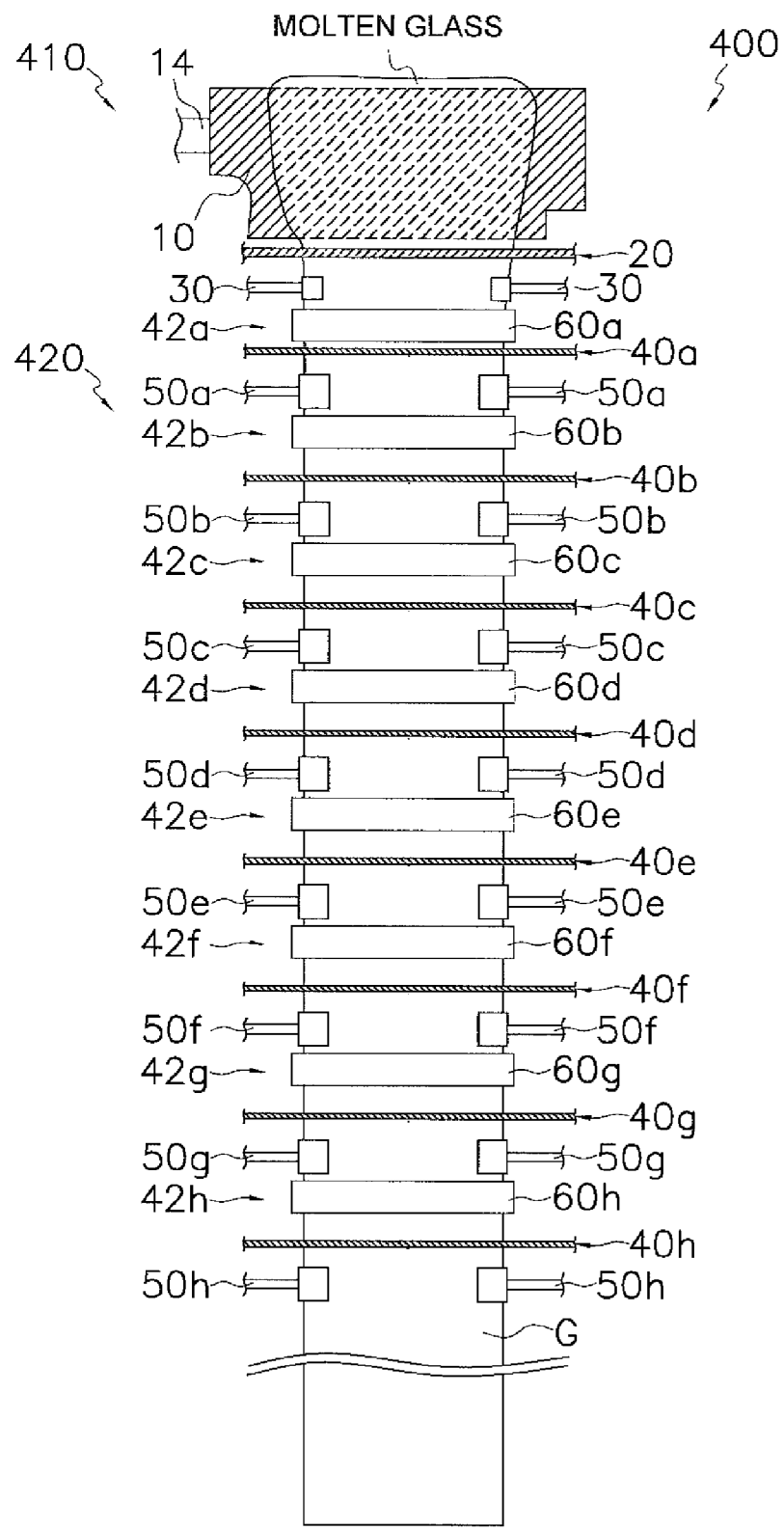
FIG. 3 is a schematic side view showing the forming device.

The forming device 400 is composed of a forming body 10, partition members 20, cooling rollers 30, heat-insulating plates 40a, 40b, and so on, feed rollers 50a, 50b, and so on, and temperature control units 60a, 60b, and so on. As shown in FIGS. 2 and 3, the forming device 400 has a forming body accommodating part 410 which is a space above the partition members 20; a forming zone 42a which is a space immediately below the partition members 20; and an annealing zone 420 which is a space below the forming zone 42a. The annealing zone 420 has a plurality of annealing spaces 42b, 42c, and so on. The forming zone 42a, annealing space 42b, annealing space 42c, and so on are stacked in the stated order top-downward in the vertical direction.

(2-1) Forming Body

As shown in FIG. 2, the forming body 10 is a member having a substantially wedge-shaped cross-section. The forming body 10 is disposed in the forming body accommodating part 410 so that the point of the wedge shape is at the lower end thereof. As shown in FIG. 3, a groove 12 is formed in an upper end surface of the forming body 10. The groove 12 is formed in the longitudinal direction of the forming body 10. A glass supply tube 14 is provided at one end of the groove 12. The groove 12 is formed so as to gradually decrease in depth from the one end thereof, at which the glass supply tube 14 is provided, to the other end.

(2-2) Partition Members

The partition members 20 are plate-shaped heat-insulating members disposed in the vicinity of the lower end of the forming body 10. The partition members 20 are disposed so that the height position of the lower ends thereof is in the range from the height position of the lower end of the forming body 10 to a height position 50 mm below the lower end of the forming body 10. As shown in FIG. 2, the partition members 20 are disposed on both sides in the thickness direction of the glass sheet G. The partition members 20 suppress the movement of heat from the forming body accommodating part 410 to the forming zone 42a by acting as a partition between the forming body accommodating part 410 and the forming zone 42a. The positioning of the partition members 20 is adjusted in advance so that the gap between the glass sheet G and the partition members 20 is 10 mm to 50 mm.

The forming body accommodating part 410 and the forming zone 42a are partitioned from each other by the heat-insulating partition members 20 for the purpose of temperature control, so that the spaces of the forming body accommodating part 410 and forming zone 42a do not affect each other as to the temperature thereof. In the manufacture of glass substrates for liquid crystal displays, for example, the partitioning described above is provided in order to maintain the atmosphere of the forming body accommodating part 410 at a temperature of 1,200 to 1,300° C. or higher, and to maintain the atmosphere of the lower space at a temperature of 400 to 700° C. (e.g., 600 to 700° C.).

In the manufacture of glass substrates for liquid crystal displays, for example, the atmosphere of the upper space is maintained at a temperature of 1,200° C. to 1,300° C. or higher in order to give the molten glass a low viscosity so that the molten glass spreads over and "wets" the surface of the forming body 10, and to prevent the width of the molten glass flow on the surface of the forming body 10 from decreasing.

In the manufacture of glass substrates for liquid crystal displays, for example, the atmosphere of the lower space is maintained at a temperature of 400 to 700° C. (e.g., 600° C. to 700° C.) in order to rapidly lower the temperature and increase the viscosity of the molten glass flow immediately after the molten glass flows are merged by the forming body 10, and thereby suppress shrinkage of the molten glass in the width direction due to surface direct force (*1) which acts on the molten glass.

(2-3) Cooling Rollers

The cooling rollers 30 are disposed in the vicinity of the partition members 20 in the forming zone 42a. The cooling rollers 30 are disposed on both sides of the glass sheet G in the thickness direction thereof.

(2-4) Heat-Insulating Members

The heat-insulating members 40a, 40b, and so on are plate-shaped heat-insulating members disposed below the cooling rollers 30 in the annealing zone 420 on both sides of the glass sheet G in the thickness direction thereof. The heat-insulating members 40a, 40b, and so on form the forming zone 42a and the annealing spaces 42b, 42c, and so on by partitioning the space below the partition members 20. For example, as shown in FIG. 2, the heat-insulating member 40a forms the forming zone 42a and the annealing space 42b, and the heat-insulating member 40b forms the annealing space 42b and the annealing space 42c. The heat-insulating members 40a, 40b, and so on suppress the movement of heat between the spaces above and below each heat-insulating member. For example, the heat-insulating member 40a suppresses the movement of heat between the forming zone 42a and the annealing space 42b, and the heat-insulating member 40b suppresses the movement of heat between the annealing space 42b and the annealing space 42c.

Figure 4:
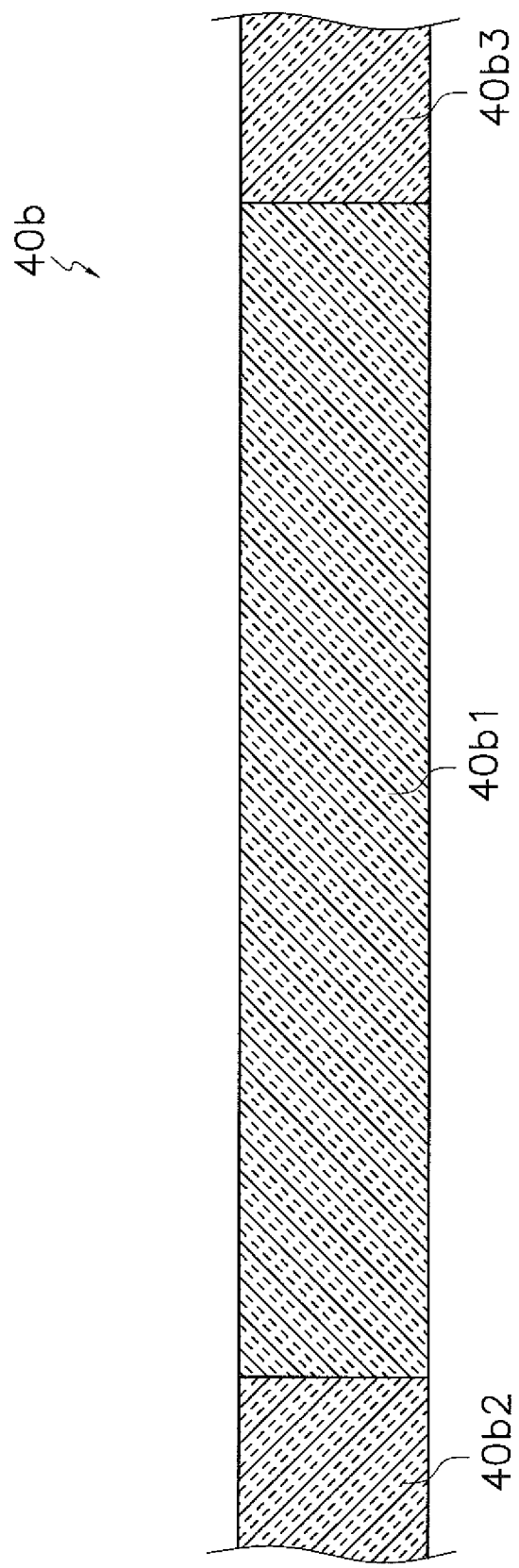
FIG. 4 is a schematic top view showing the heat-insulating member.
Figure 5:
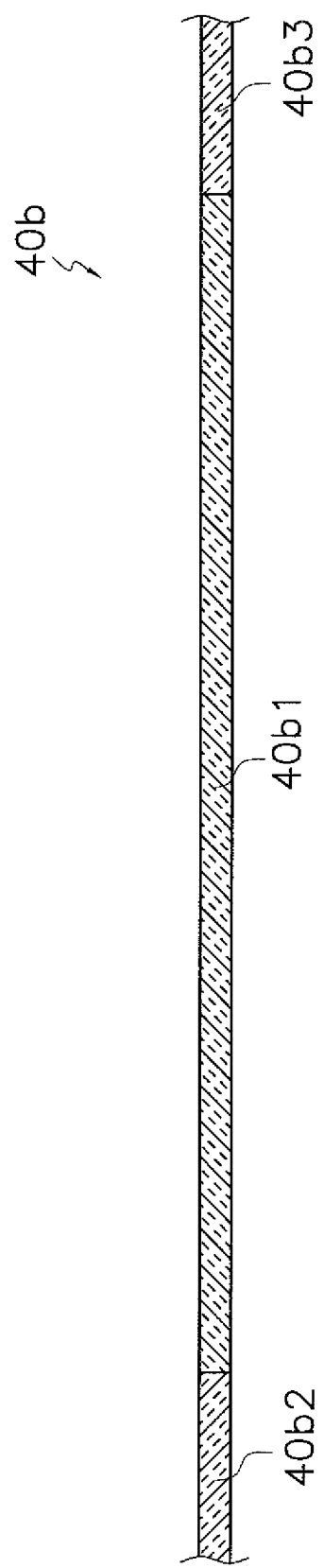
FIG. 5 is a schematic side view showing the heat-insulating member.

The heat-insulating members 40a, 40b, and so on are composed of first heat-insulating plates 40a1, 40b1, and so on, second heat-insulating plates 40a2, 40b2, and so on, and second heat-insulating plates 40a3, 40b3, and so on, respectively. The second heat-insulating plates 40a2, 40b2, and so on and the second heat-insulating plates 40a3, 40b3, and so on are disposed near both ends of the first heat-insulating plates 40a1, 40b1, and so on, respectively, in the width direction of the glass sheet G. For example, in the heat-insulating member 40b as shown in FIGS. 4 and 5, the second heat-insulating plate 40b2 and second heat-insulating plate 40b3 are disposed adjacent to both ends of the first heat-insulating plate 40b1 in the width direction of the glass sheet G. The first heat-insulating plates 40a1, 40b1, and so on are fixed in place by beams or the like. The second heat-insulating plates 40a2, 40b2, and so on and the second heat-insulating plates 40a3, 40b3, and so on are provided so as to be able to move in the thickness direction of the glass sheet G. The distance between the glass sheet G and the second heat-insulating plates 40a2, 40b2, and so on and the second heat-insulating plates 40a3, 40b3, and so on can be adjusted by moving the second heat-insulating plates 40a2, 40b2, and so on.

In the present embodiment, the positions of the first heat-insulating plates 40a1, 40b1, and so on are fixed in advance and the positions of the second heat-insulating plates 40a2, 40b2, and so on and the second heat-insulating plates 40a3, 40b3, and so on are adjusted so that the gap between the glass sheet G and the heat-insulating members 40a, 40b, and so on is 10 mm to 50 mm.

(2-5) Feed Rollers

The feed rollers 50a, 50b, and so on are disposed in the annealing zone 420 on both sides of the glass sheet G in the thickness direction thereof. The feed rollers 50a, 50b, and so on are disposed in the annealing spaces 42b, 42c, and so on, respectively. For example, the feed rollers 50a are disposed in the annealing space 42b, and the feed rollers 50b are disposed in the annealing space 42c.

(2-6) Temperature Control Units

The temperature control units 60a, 60b, and so on are disposed in the forming zone 42a and the annealing spaces 42b, 42c, and so on, respectively, and measure and control the atmospheric temperatures of the forming zone 42a and the annealing spaces 42b, 42c, and so on. The temperature control units 60a, 60b, and so on control the atmospheric temperatures of the forming zone 42a and the annealing spaces 42b, 42c, and so on so that the atmospheric temperature in the vicinity of the glass sheet G forms a predetermined temperature distribution (referred to hereinafter as a "temperature profile") in the width direction of the glass sheet G.

(3) Operation (3-1)

The process by which the glass sheet G is formed by the forming device 400 is described below.

The molten glass created in the melting furnace 200 and divested of air bubbles in the refining furnace 300 is sent to the forming body accommodating part 410 of the forming device 400. In the forming body accommodating part 410, the molten glass is fed to the groove 12 of the forming body 10 via the glass supply tube 14. Molten glass overflowing from the groove 12 forms split flows in the transverse direction of the forming body 10 and flows down along the surfaces of both sides of the forming body 10. The downward-flowing molten glass merges at the lower end portion of the forming body 10. The merged molten glass flows downward, continuously forming a plate-shaped glass sheet G.

The glass sheet G formed in the forming body accommodating part 410 is sent to the forming zone 42a and the annealing zone 420.

The glass sheet G is drawn down by the feed rollers 50a, 50b, and so on of the annealing zone 420. The glass sheet G drawn down by the feed rollers 50a, 50b, and so on is held between cooled metal cooling rollers 30 only at the area of the glass sheet G near both ends thereof, the cooling rollers 30 being set so that the peripheral speed thereof is less than that of the feed rollers 50a, 50b, and so on in the forming zone 42a on the upstream side thereof, and the tendency of the sheet width to decrease due to the surface tension of the glass itself and the downward tension applied by the feed rollers 50a, 50b, and so on is thereby suppressed to some degree.

In the forming zone 42a and the annealing zone 420, the temperature profile of the forming zone 42a and the annealing spaces 42b, 42c, and so on is controlled by the temperature control units 60a, 60b, and so on. Specifically, the atmospheric temperatures of the forming zone 42a and the annealing spaces 42b, 42c, and so on are measured, and the atmospheric temperatures of the forming zone 42a and the annealing spaces 42b, 42c, and so on are controlled so that a predetermined temperature profile is obtained.

Specifically, by obtaining a predetermined temperature profile in the width direction of the glass sheet G in the forming zone 42a and the annealing spaces 42b, 42c, and so on, the thickness of the glass sheet G can be made uniform, and warping and distortion thereof can be reduced.

In order to reduce distortion, for example, the glass sheet G formed in the forming body accommodating part 410 and the forming zone 42a is preferably uniformly annealed in the annealing zone 420.

Thermal shrinkage of the glass sheet G can also be reduced by obtaining a predetermined temperature profile in the flow direction of the glass sheet G in the forming zone 42a and the annealing spaces 42b, 42c, and so on.

(3-2)

Figure 6:
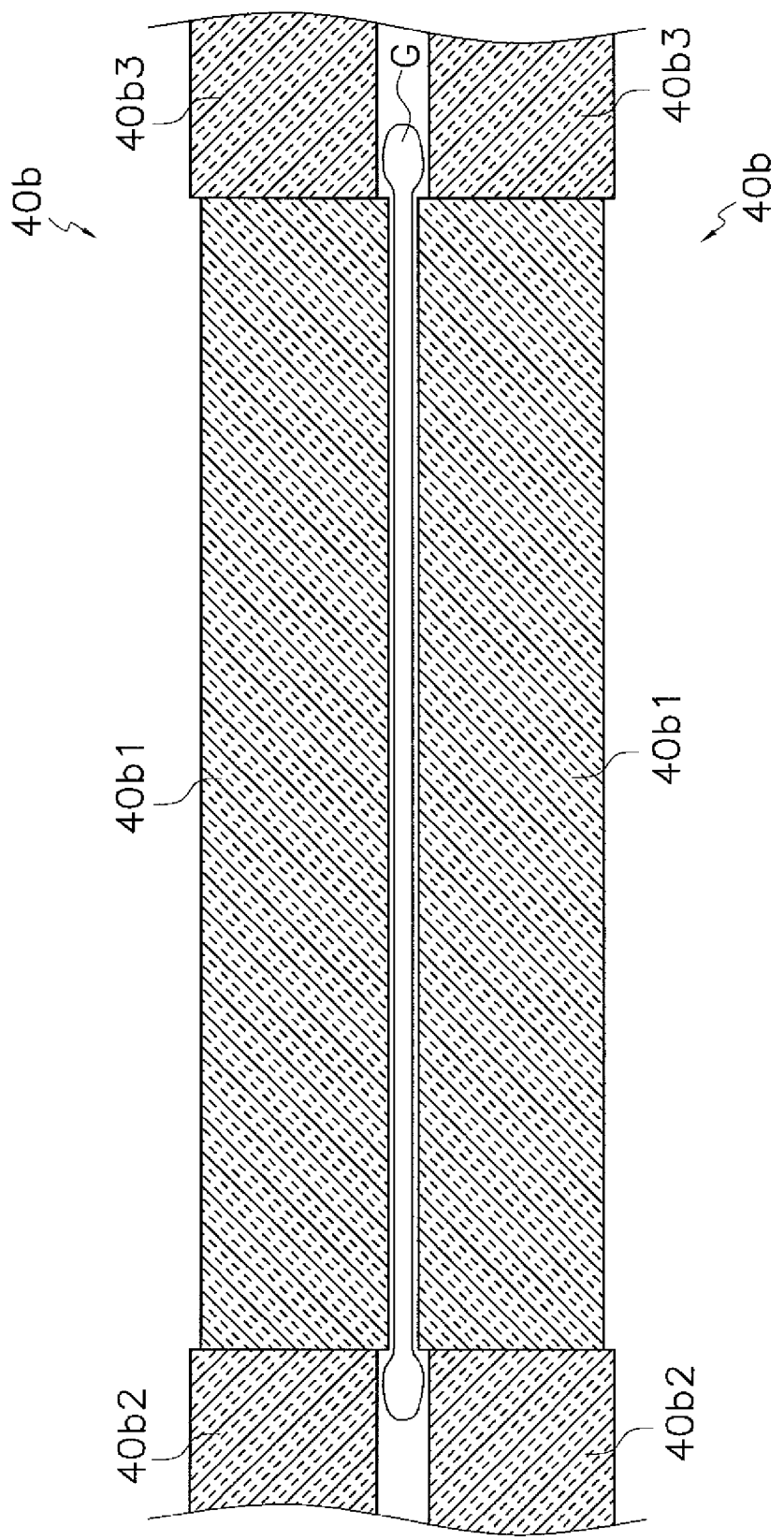
FIG. 6 is a schematic view showing the pair of heat-insulating members with the glass sheet therebetween in plan view.

The process of moving the second heat-insulating plates 40a2, 40b2, and so on and the second heat-insulating plates 40a3, 40b3, and so on in the thickness direction of the glass sheet G will next be described. As an example, FIG. 6 is a plan view showing the pair of heat-insulating members 40b, between which is held the glass sheet G annealed in the annealing zone 420. The heat-insulating members 40b are described below, but this description is also applicable to the heat-insulating members 40a, 40b, and so on.

It is preferred that the gap between the heat-insulating members 40b and the glass sheet G be as small as possible in order to suppress the movement of heat between the annealing spaces 42b, 42c. However, the glass sheet G annealed in the annealing zone 420 has a cross-sectional shape in which both end parts thereof in the width direction are swollen. In the present embodiment, as shown in FIG. 6, the first heat-insulating plates 40b1 are fixed so as to be as close as possible to the glass sheet G according to the thickness of the glass sheet G, and the second heat-insulating plates 40b2, 40b3 are moved so as to be as close as possible to the glass sheet G according to the shape of the end portions of the glass sheet G in the width direction. Specifically, the gap between the heat-insulating members 40b and the glass sheet G is made as small as possible by adjusting the positions of the second heat-insulating plates 40b2, 40b3 according to the cross-sectional shape of the glass sheet G. Specifically, the positions of the second heat-insulating plates 40b2, 40b3 are adjusted so that the gap between the pair of first heat-insulating plates 40b1 facing the thin width-direction center portion of the glass sheet G is smaller than the gap between the pairs of second heat-insulating plate second heat-insulating plates 40b2, 40b3 facing the thick width-direction end portions of the glass sheet G. The open area of the gap between the pair of heat-insulating members 40b is thereby reduced.

(4) Features

In the glass sheet manufacturing apparatus 100 according to the present embodiment, the heat-insulating members 40a, 40b, and so on are composed of first heat-insulating plates 40a1, 40b1, and so on, second heat-insulating plates 40a2, 40b2, and so on, and second heat-insulating plates 40a3, 40b3, and so on, respectively. The first heat-insulating plates 40a1, 40b1, and so on are fixedly provided, and the second heat-insulating plates 40a2, 40b2, and so on and second heat-insulating plates 40a3, 40b3, and so on are provided so as to be able to move in the horizontal direction.

The thickness of the glass sheet G annealed in the annealing zone 420 varies in the width direction of the glass sheet G. The thickness of both width-direction end portions of the glass sheet G is generally greater than the thickness of the width-direction center portion thereof. The first heat-insulating plates 40a1, 40b1, and so on are disposed so as to face the surface of the width-direction center portion of the glass sheet G. The second heat-insulating plates 40a2, 40b2, and so on and the second heat-insulating plates 40a3, 40b3, and so on are disposed so as to face the surface of both width-direction end portions of the glass sheet, respectively. The first heat-insulating plates 40a1, 40b1, and so on are fixed in advance according to the thickness of the glass sheet G, and the second heat-insulating plates 40a2, 40b2, and so on and second heat-insulating plates 40a3, 40b3, and so on are moved according to the shape of the width-direction end portions of the glass sheet G. Specifically, the positions of the second heat-insulating plates 40a2, 40b2, and so on and the second heat-insulating plates 40a3, 40b3, and so on in the horizontal direction are adjusted so that the respective gaps between the second heat-insulating plates 40a2, 40b2, and so on and the second heat-insulating plates 40a3, 40b3, and so on and the glass sheet G are as small as possible. The open area of the gaps between the pairs of heat-insulating members 40a, 40b, and so on can thereby be reduced as much as possible, and the movement of heat between the adjacent forming zone 42a and annealing spaces 42b, 42c, and so on can therefore be efficiently suppressed.

Consequently, in the glass sheet manufacturing apparatus 100 according to the present embodiment, the atmospheric temperatures of the annealing spaces 42b, 42c, and so on can be controlled so as to fit the desired temperature profile, and the glass sheet can therefore be effectively annealed. Specifically, distortion of the glass sheet can be suppressed in the glass sheet manufacturing apparatus 100 according to the present embodiment.

(5) Modifications (5-1) Modification A

A glass sheet manufacturing apparatus 100 provided with a forming device 400 for forming a glass sheet G using an overflow downdraw method is described in the present embodiment, but the glass sheet manufacturing apparatus 100 may also be provided with a forming device for forming a glass sheet using a slot downdraw method.

(5-2) Modification B

The forming device 400 is provided with heat-insulating members 40a, 40b, and so on in the present embodiment, but a glass flow rate control mechanism may be further provided for controlling the flow rate of molten glass supplied to the forming body 10, so that the thickness of the formed glass sheet G remains constant.

In the present modification, the flow rate of molten glass supplied to the forming body 10 is calculated by measuring the weight of the glass sheet G formed by the forming device 400. The glass flow rate control mechanism controls the flow rate of molten glass by changing the temperature of a molten glass supply tube (not shown in the drawing) installed in the forming device 400 in the case that the calculated flow rate of molten glass is outside a set range. For example, the glass flow rate control mechanism raises the temperature of the molten glass supply tube when the flow rate of molten glass is below the minimum value of the set range. The viscosity of the molten glass in the molten glass supply tube is thereby reduced, and the flow rate of the molten glass supplied to the forming body 10 therefore increases. Conversely, when the flow rate of molten glass is above the maximum value of the set range, the glass flow rate control mechanism lowers the temperature of the molten glass supply tube. The viscosity of the molten glass in the molten glass supply tube is thereby increased, and the flow rate of molten glass supplied to the forming body 10 therefore decreases. Methods for changing the temperature of the molten glass supply tube may include, for example, passing an electric current to the molten glass supply tube to heat the molten glass supply tube and thereby control the temperature of the molten glass supply tube. The glass flow rate control mechanism thus controls the flow rate of molten glass supplied to the forming body 10 by adjusting the temperature of the molten glass supply tube. The flow rate of molten glass can thus be kept constant in the present modification, and the thickness and/or width of the formed glass sheet G can therefore be kept constant.

(5-3) Modification C

A forming device 400 provided with heat-insulating members 40a, 40b, and so on and a glass flow rate control mechanism is described in Modification C of the present embodiment, but a glass sheet G may also be formed using a forming device that is provided with a glass flow rate control mechanism but not with heat-insulating members 40a, 40b, and so on.

(5-4) Modification D

Figure 7:
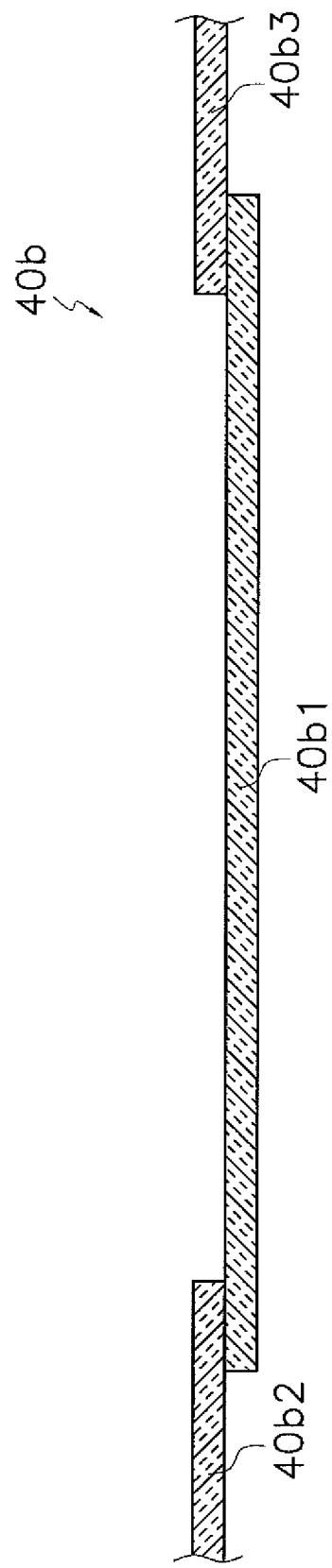
FIG. 7 is a schematic side view showing the heat-insulating member in Modification D.

In the present embodiment, the second heat-insulating plates 40a2, 40b2, and so on and the second heat-insulating plates 40a3, 40b3, and so on are disposed adjacent to either end of the first heat-insulating plates 40a1, 40b1, and so on, respectively, in the width direction of the glass sheet G, as shown in FIG. 5. However, the second heat-insulating plates 40a2, 40b2, and so on and the second heat-insulating plates 40a3, 40b3, and so on may also be disposed so as to partially overlap with either end portion of the first heat-insulating plates 40a1, 40b1, and so on, respectively, in the width direction of the glass sheet G, as shown in FIG. 7.

(5-5) Modification E

In the present embodiment, the first heat-insulating plates 40a1, 40b1, and so on are fixed in position and the second heat-insulating plates 40a2, 40b2, and so on and second heat-insulating plates 40a3, 40b3, and so on are provided so as to be able to move in the thickness direction of the glass sheet G. However, the heat-insulating plates may be configured in any manner insofar as at least one of the first heat-insulating plates 40a1, 40b1, and so on, the second heat-insulating plates 40a2, 40b2, and so on, and the second heat-insulating plates 40a3, 40b3, and so on can move in the thickness direction of the glass sheet G. For example, the second heat-insulating plates 40a2, 40b2, and so on may be fixed, and the first heat-insulating plates 40a1, 40b1, and so on may be movably provided.

(5-6) Modification F

The heat-insulating members 40a, 40b, and so on are each composed of three heat-insulating plates, made up of first heat-insulating plates 40a1, 40b1, and so on, second heat-insulating plates 40a2, 40b2, and so on, and second heat-insulating plates 40a3, 40b3, and so on in the present embodiment, but the heat-insulating members 40a, 40b, and so on may be composed of five, seven, or more heat-insulating plates.

In the present modification, the shape of the heat-insulating members 40a, 40b, and so on can be more finely adjusted according to the cross-sectional shape of the glass sheet G. The gaps between the heat-insulating members 40a, 40b, and so on and the glass sheet G can thereby be further reduced, and the movement of heat between adjacent annealing spaces 42b, 42c, and so on can be more efficiently suppressed. Shrinkage of the glass sheet G in the width direction thereof can thus be more efficiently suppressed by the present modification.

(5-7) Modification G

The heat-insulating members 40a, 40b, and so on are each composed of three heat-insulating plates, made up of first heat-insulating plates 40a1, 40b1, and so on, second heat-insulating plates 40a2, 40b2, and so on, and second heat-insulating plates 40a3, 40b3, and so on in the present embodiment, but the partition members 20 may also be composed of a plurality of plate-shaped components, and some of these components may be provided so as to be able to move in the thickness direction of the glass sheet G.

In the present modification, the shapes of the partition members 20 may be changed according to the cross-sectional shape of the glass sheet G moving downward through the forming body accommodating part 410. For example, a portion of the components constituting the partition members 20 are moved in the thickness direction of the glass sheet G in order to make the gap between the partition members 20 and the glass sheet G as small as possible. The movement of heat between the annealing space 42a and the forming body accommodating part 410 adjacent to the partition members 20 can thereby be suppressed. Shrinkage of the glass sheet G in the width direction thereof can thus be more efficiently suppressed in the present modification.

(5-8) Modification H

The heat-insulating members 40a, 40b, and so on are each composed of three heat-insulating plates, made up of first heat-insulating plates 40a1, 40b1, and so on, second heat-insulating plates 40a2, 40b2, and so on, and second heat-insulating plates 40a3, 40b3, and so on in the present embodiment, but may be composed of a single partition plate which corresponds to a sheet thickness variation of the glass sheet G.

(5-9) Modification I

In the present embodiment, the heat-insulating members 40a, 40b, and so on are each composed of three heat-insulating plates, made up of first heat-insulating plates 40a1, 40b1, and so on, second heat-insulating plates 40a2, 40b2, and so on, and second heat-insulating plates 40a3, 40b3, and so on, and the second heat-insulating plates 40a2, 40b2, and so on and the second heat-insulating plates 40a3, 40b3, and so on are disposed facing the surfaces of both width-direction end portions of the glass sheet G. However, as shown in FIG. 6, since the second heat-insulating plates 40a2, 40b2, and so on and the second heat-insulating plates 40a3, 40b3, and so on are disposed so that the width thereof exceeds that of the glass sheet G, the portions not occupied by the downflow of the glass sheet G form spaces sandwiched by the end faces of the pairs of second heat-insulating plates 40a2, 40b2, and so on (or second heat-insulating plates 40a3, 40b3, and so on). The second heat-insulating plates 40a2, 40b2, and so on and the second heat-insulating plates 40a3, 40b3, and so on may therefore further comprise two small heat-insulating plates in order to reduce the amount of the space described above.

Figure 8:
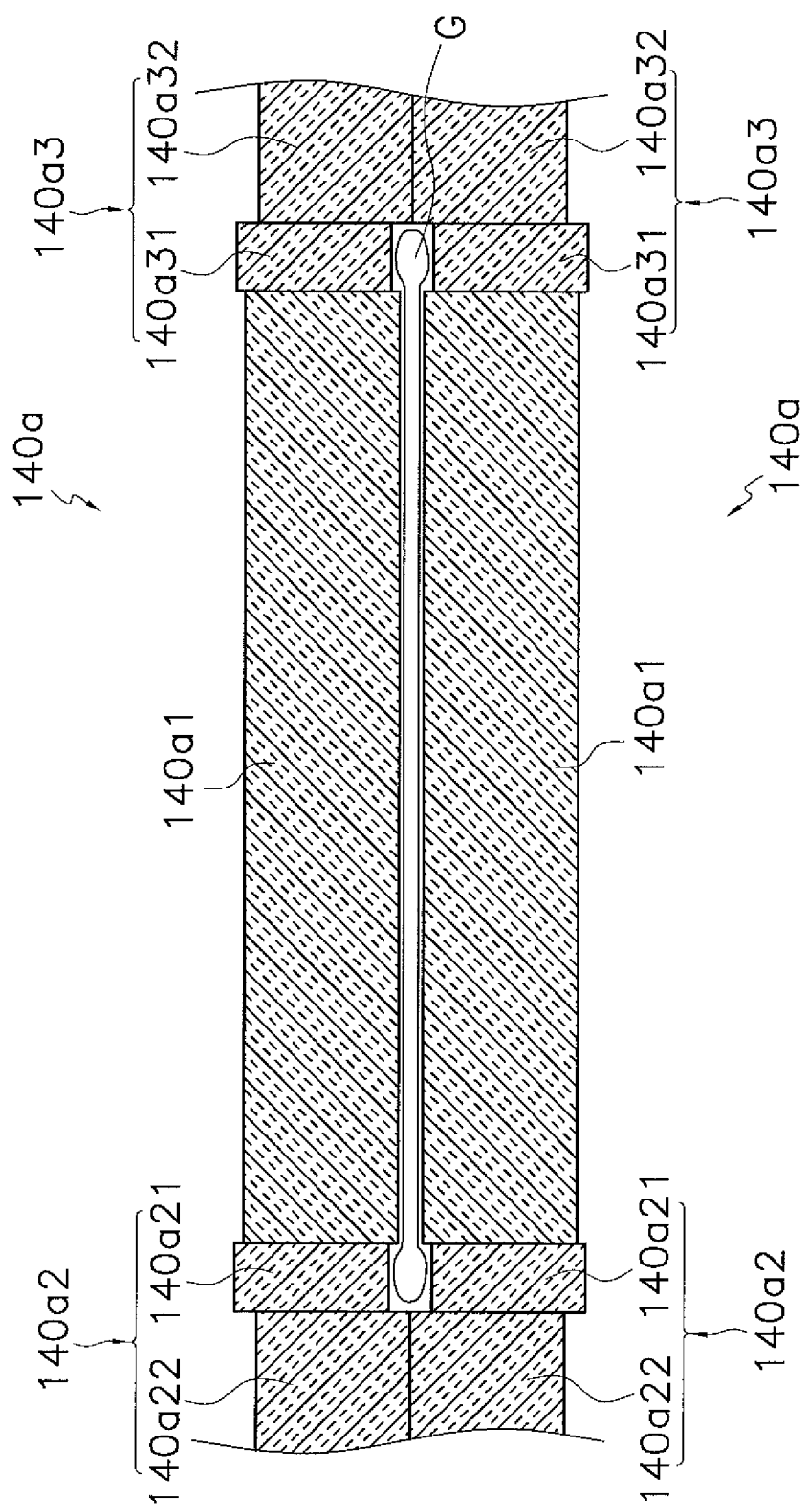
FIG. 8 is a schematic top view showing the heat-insulating member in Modification I.

In the present modification, heat-insulating members 140a (the same configuration applying to the other heat-insulating members hereinafter) are each composed of one first heat-insulating plate 140a1 and two second heat-insulating plates 140a2, 140a3, the second heat-insulating plate 140a2 is further composed of a first small heat-insulating plate 140a21 and a second small heat-insulating plate 140a22, and the second heat-insulating plate 140a3 is further composed of a first small heat-insulating plate 140a31 and a second small heat-insulating plate 140a32, as shown in FIG. 8. In each second heat-insulating plate 140a2, the first small heat-insulating plate 140a21 is connected to the second small heat-insulating plate 140a22 in the width direction of the glass sheet G. Each first small heat-insulating plate 140a21 is connected to a first heat-insulating plate 140a1 in the width direction of the glass sheet G. Specifically, each first small heat-insulating plate 140a21 is disposed between a first heat-insulating plate 140a1 and a second small heat-insulating plate 140a22. Likewise in each second heat-insulating plate 140a3, the first small heat-insulating plate 140a31 is disposed between a first heat-insulating plate 140a1 and a second small heat-insulating plate 140a32, according to the same configuration as in each second heat-insulating plate 140a2.

In the present modification, the first small heat-insulating plates 140a21, 140a31 of the second heat-insulating plates 140a2, 140a3 are disposed facing the surfaces of both width-direction end portions of the glass sheet G, as shown in FIG. 8. The second small heat-insulating plates 140a22, 140a32 of the second heat-insulating plates 140a2, 140a3 on one side are disposed facing the second small heat-insulating plates 140a22, 140a32 of the other side. Specifically, the pair of second small heat-insulating plates 140a22 (or the pair of second small heat-insulating plates 140a32) are disposed so that end surfaces thereof touch each other, or so that the end surfaces thereof are extremely close to each other. The open area of the gap between the pair of heat-insulating members 140a and the glass sheet G can thereby be more effectively reduced, and the movement of heat between adjacent annealing spaces 42b, 42c, and so on can therefore be more efficiently suppressed.

INDUSTRIAL APPLICABILITY

By the method of manufacturing a glass sheet according to the present invention, distortion of the glass sheet can be suppressed.

REFERENCE SIGNS LIST 10 forming body
12 groove
14 glass supply tube
20 partition members
30 cooling rollers
40a, 40b, and so on heat-insulating members
40a1, 40b1, and so on first heat-insulating plates
40a2, 40b2, and so on second heat-insulating plates
40a3, 40b3, and so on second heat-insulating plates
42a forming zone
42b, 42c, and so on annealing spaces
50a, 50b, and so on feed rollers
60a, 60b, and so on temperature control units
100 glass sheet manufacturing apparatus
200 melting furnace
300 refining furnace
400 forming device
410 forming body accommodating part
420 annealing zone
G glass sheet

CITATION LIST

Patent Literature

<Patent Document 1> Japanese Unexamined Patent Application Publication No. 2008-88005

The invention claimed is:

1. A method of manufacturing a glass sheet, comprising the steps of creating split flows of molten glass in a forming body and causing the molten glass to flow down, subsequently merging the flows at a merging point to form a glass sheet and causing the glass sheet to flow downward in the vertical direction; the method of manufacturing a glass sheet characterized in that there are provided a plurality of chambers separated by heat-insulating plates in the direction of movement of the glass sheet, and a heater for controlling the temperature of the chamber is provided for each of the chambers so that the temperature of the chamber decreases in order in the direction of movement of the glass sheet; and the heat-insulating plate is disposed facing the glass sheet, and a facing surface of the heat-insulating plate is shaped so as to correspond to a sheet thickness variation of the glass sheet, so that a gap between the glass sheet and the heat-insulating plate is substantially uniform.

2. The method of manufacturing a glass sheet according to claim 1, characterized in that the facing surface of the heat-insulating plate is shaped so as to correspond to the sheet thickness variation of the glass sheet, so that the gap between the glass sheet and the heat-insulating plate decreases.

3. The method of manufacturing a glass sheet according to claim 1, characterized in that the sheet thickness of the glass sheet is greater at both end portions thereof than at a center portion thereof.

4. The method of manufacturing a glass sheet according to claim 1, characterized in that
the heat-insulating plate has members which are independent of each other and correspond to a center portion and both end portions of the glass sheet.

5. The method of manufacturing a glass sheet according to claim 4, characterized in that
the members separate from and come close to the glass sheet.

6. The method of manufacturing a glass sheet according to claim 2, characterized in that
the sheet thickness of the glass sheet is greater at both end portions thereof than at a center portion thereof.

7. The method of manufacturing a glass sheet according to claim 2, characterized in that
the heat-insulating plate has members which are independent of each other and correspond to a center portion and both end portions of the glass sheet.

8. The method of manufacturing a glass sheet according to claim 3, characterized in that
the heat-insulating plate has members which are independent of each other and correspond to a center portion and both end portions of the glass sheet.

9. The method of manufacturing a glass sheet according to claim 6, characterized in that
the heat-insulating plate has members which are independent of each other and correspond to a center portion and both end portions of the glass sheet.

10. The method of manufacturing a glass sheet according to claim 7, characterized in that
the members separate from and come close to the glass sheet.

11. The method of manufacturing a glass sheet according to claim 8, characterized in that
the members separate from and come close to the glass sheet.

12. The method of manufacturing a glass sheet according to claim 9, characterized in that
the members separate from and come close to the glass sheet.

* * * * *